Patented July 26, 1938

2,125,218

UNITED STATES PATENT OFFICE 2,125,218

METHOD OF REFINING SULPHURIZED ORGANIC MATERIALS

Joseph N. Borglin, Wilmington, Del., assignor to Hercules Powder Company, Wilmington, Del., a corporation of Delaware No Drawing. Application May 1, 1934, Serial No. 723,330

10 Claims. (Cl. 260—17)

This invention relates to a method for refining sulphurized organic materials such as, for example, sulphurized lard oil, cottonseed oil, petroleum oil, and the like and more particularly to a method for refining sulphurized naval stores products, i. e. products obtained from the southern pine and derivatives thereof, such as, sulphurized pine oil, turpentine, Dipolymer, rosin, rosin esters, etc., or sulphurized constituents of such naval stores products as, various terpenes, for example, terpineol, anethol, pinene, dipentene, terpinolene, terpinene, di- and poly-terpenes, etc., and abietyl compounds, for example, abietic acid, alkyl abietates, abietyl alcohol, etc.

The term "sulphurized" is known to the art as referring to treatment involving heating with elemental sulphur or sulphur compounds capable of liberating elemental sulphur during the treatment. Sulphurized organic materials are accordingly organic compounds which have been so treated, and which therefore contain combined sulphur. Sulphurized naval stores products are materials formed by the direct combination of elemental sulphur and the naval stores product. Their production is described in U. S. Patent No. 1,844,400 to W. H. Kobbé and U. S. Patent No. 1,926,687 to R. C. Palmer and P. O. Powers.

Sulphurized organic materials, such as, for example, the products produced by the methods described in these patents, while useful for certain purposes, are nevertheless unsuited for many uses to which they might otherwise be adapted by reason of their extremely dark color, which in most cases is almost jet black.

It has been found in accordance with this invention that these dark-colored products may be refined to produce materials of very light color which are adapted for many uses for which the unrefined products are unsuitable.

The method in accordance with this invention for the refining of sulphurized organic materials involves broadly their treatment in a suitable manner with an anhydrous halide of an amphoteric element, for example, boron trifluoride, zinc chloride, aluminum chloride, stannic chloride, antimony chloride, etc., or with sulphur monochloride, etc. These halides unite with the color-producing bodies in the sulphurized product to form a material insoluble in solvents for the sulphurized product. Separation of the purified sulphurized product may accordingly be easily accomplished by filtration, decantation, or the like, and the refined product obtained by evaporation of the solvent. Petroleum hydrocarbons such as, gasoline, naphtha, etc. are suitable solvents for use in the refining process, but other solvents, as, for example, petroleum ether, hexane, may be used.

The unrefined sulphurized organic material will be dissolved in the selected solvent to a concentration of from 5 to 30%, and the refining agent added. Where a gaseous refining agent, as boron trifluoride, is used, it will be passed through the solution until no further precipitation occurs. Solid or liquid refining agents, as zinc chloride, aluminum chloride, stannic chloride, etc. will preferably be added in solution, if soluble therein, or in suspension in the solvent for the sulphurized material. The refining agent may also be dissolved in a solvent different from that employed for the solution of the sulphurized product but miscible with the latter. Such solvents are, for example, carbon tetrachloride, ethylene dichloride, ethyl ether, ethyl acetate, isopropyl ether, and the like. Alternatively, the refining agent either per se or in solution, may be added directly to the sulphurized material, if the latter be liquid, and the mixture then added to a solvent, as for example, gasoline, which will dissolve out the refined sulphurized product.

The refining agent will usually be employed in an amount of 0.1 to 25% by weight of the sulphurized material, preferably 1 to 5%. Temperature has only a slight effect on the purification process, and any suitable temperature, for example, from —20° C. to 130° C. may be used. Preferably a temperature of about 15°-30° C. will be employed. Where a gaseous refining agent, as for example, boron trifluoride, is employed, superatmospheric pressure, up to about 100 atmospheres, will be found advantageous, although not necessary, since it will increase the solubility of the gas and so speed up the reaction. The refining reaction usually requires from 6 min. to 24 hours for its completion.

The refining treatment in accordance with this invention, while applicable generally to the treatment of any sulphurized organic material, will be found to be especially applicable for the refining of the light-colored sulphurized organic products produced by the method described in my copending application for Letters Patent, Serial No. 723,329, filed May 1, 1934, when it is desired to improve the color of these materials still further to enable their more advantageous use in paints, varnishes, and the like.

The following examples are illustrative of the practical embodiment of the method for refining sulphurized organic products in accordance with this invention.

Example I 100 g. of a sulphurized pine oil are dissolved in gasoline to form a 25% solution. The solution is reddish in color. A stream of boron trifluoride is then passed into the solution at room temperature until the black precipitate thereby formed ceases to form. The solution is then filtered and washed with water. Upon evaporation of the gasoline a very pale yellow sulphurized pine oil is obtained.

Example II 300 parts of sulphurized material prepared in the absence of air from a caustic steam-distilled pine oil are dissolved in gasoline to form a 10% solution, to which is added 1 part of stannic chloride. The red-brown precipitate formed is removed by filtration, and the clear solution water-washed and evaporated. An extremely light yellow sulphurized pine oil is obtained.

Example III 25 g. of sulphurized methyl abietate are dissolved in 100 g. of gasoline. To this solution are added 26 g. of gasoline solution containing 1 g. of sulphur monochloride. After standing for a short time, the solution is filtered, water washed and evaporated under reduced pressure. An improved product of light color is recovered.

Example IV

To 25 g. of sulphurized methyl abietate dissolved in 100 g. of gasoline are added 2 g. of anhydrous aluminum chloride, with agitation. After about ten hours the solution is filtered, water washed and evaporated under reduced pressure. As a result 21 g. or an 84% yield of pale sulphurized methyl abietate is recovered. In color this pale product is equivalent to an N grade of rosin.

Example V

Sulphurized methyl abietate is dissolved in gasoline to a 25% solution. To this solution is added 2% of stannic chloride as a 10% solution in gasoline, with agitation. After standing a few hours the solution is filtered, water washed and evaporated under reduced pressure. As a result an 85% recovery of a pale product is obtained. This product is equivalent to a WW grade of rosin insofar as color is concerned.

Example VI 25 g. of sulphurized I rosin are dissolved in 75 g. of gasoline. To this solution is added, with stirring, 2 g. of stannic chloride in 20 g. of gasoline. After standing a few hours the solution is filtered, water washed and evaporated. As a result a 72% yield of product is recovered which has a color grading of K on the rosin scale.

Example VII 100 parts of an extremely dark-colored sulphurized pine oil produced in the presence of air and at a temperature of about 180° C. is dissolved in gasoline to give a 20% solution. 3 parts of stannic chloride in 30 parts of gasoline are added, and the solution after standing for several hours is filtered, water-washed, and evaporated under reduced pressure. A pale colored product is obtained.

Example VIII

A dark-colored lard oil containing 15% of sulphur, made by heating lard oil and sulphur at a temperature above 100° C., was dissolved in a low boiling naphtha to form a 25% solution. To this solution was added, with agitation, 2% of stannic chloride as a 10% solution in the same solvent. The resulting precipitate was separated and the clear pale solution of partially refined sulphurized product was water washed. The washed solution was evaporated to remove the solvent. As a result a product was recovered which was equivalent in color to an I grade of rosin.

Example IX

A dark-colored sulphurized cottonseed oil containing 15% of sulphur was used. 10 parts by weight of sulphurized cottonseed oil were dissolved in 50 parts by weight of gasoline. To this solution was added, with agitation, 0.2 part by weight of stannic chloride dissolved in 10 parts by weight of gasoline. The resulting precipitate was allowed to settle and the clear solution after decantation was evaporated under reduced pressure to remove the solvent. As a result a 70% yield of pale colored product was obtained which was equivalent in color to a K grade of rosin.

Example X

A nearly black sulphurized petroleum lubricating oil which had been treated with 70% of sulphur was used. 30 parts by weight of sulphurized lubricating oil were dissolved in 150 parts by weight of low boiling gasoline. To this was added with agitation 1 part by weight of stannic chloride dissolved in the same solvent to form a 10% solution. The precipitate was allowed to settle and the clear partially refined solution decanted, water washed and evaporated. As a result an 83.5% yield of product was recovered which was equivalent in color to an E to F grade of rosin.

Example XI 45 parts by weight of a sulphurized polyterpene, commercially known as "Dipolymer", which was dark in color and which contained 20% of combined sulphur was dissolved in 255 parts by weight of low boiling gasoline. To this was added slowly and with agitation 1 part by weight of anhydrous aluminum chloride dissolved in 10 parts by weight of ethyl acetate. The precipitate was allowed to settle, the clear solution decanted, water washed and evaporated under reduced pressure. As a result an 82.5% of sulphurized product was recovered which was equivalent in color to an H grade of rosin.

Example XII 45 parts by weight of the sulphurized "Dipolymer" referred to in Example XI was dissolved in 255 parts by weight of low boiling gasoline. To this was added, with agitation, 2 parts by weight of anhydrous aluminum chloride dissolved in 10 parts by weight of ethyl ether. The precipitate was allowed to settle, the clear solution decanted, water washed and evaporated under reduced pressure. As a result a 76% yield of pale colored sulphurized product was recovered which was equivalent to a WW grade of rosin in color.

The products of the method in accordance with this invention will be characterized by a much lighter color than similar products heretofore prepared and will be resistant to further discoloration upon use. They will consequently be suitable for use in, for example, greases, disinfectant sprays, flotation processes, etc., for which purposes the dark-colored products heretofore known cannot be readily sold.

They will furthermore be suitable for use in paints, varnishes, etc., where the dark-colored products previously known could not be used.

What I claim and desire to protect by Letters Patent is:

1. A method of refining a sulphurized material from the group consisting of sulphurized oils, sulphurized terpenes, sulphurized terpene compounds, and sulphurized abietyl compounds, which includes treating said sulphurized material in crude form, in solution in a solvent inert thereto, with an anhydrous halide of an amphoteric element.

2. A method of refining a sulphurized material from the group consisting of sulphurized oils, sulphurized terpenes, sulphurized terpene compounds, and sulphurized abietyl compounds, which includes treating said sulphurized material in crude form, in solution in a solvent inert thereto, with an anhydrous halide of an amphoteric element, separating from said solution was precipitate formed, evaporating said solvent from said solution, and recovering the purified sulphurized material.

3. A method of refining a sulphurized terpene which includes treating said sulphurized terpene in crude form, in solution in a solvent inert thereto, with an anhydrous halide of an amphoteric element.

4. A method of refining a sulphurized abietyl compound which includes treating said sulphurized abietyl compound in crude form in solution in a solvent inert thereto, with an anhydrous halide of an amphoteric element.

5. A method of refining a sulphurized pine oil which includes treating said sulphurized pine oil, in crude form, in solution in gasoline, with an anhydrous halide of an amphoteric element.

6. A method of refining a sulphurized pine oil which includes treating said sulphurized pine oil, in crude form, in solution in gasoline with anhydrous boron trifluoride.

7. A method of refining a sulphurized pine oil which includes treating said sulphurized pine oil, in crude form, in solution in gasoline, with anhydrous zinc chloride.

8. A method of refining a sulphurized terpene which includes treating said sulphurized terpene in crude form, in solution in a solvent inert thereto with an anhydrous halide of an amphoteric element selected from the group consisting of boron trifluoride, zinc chloride, aluminum chloride, stannic chloride, antimony chloride and sulphur monochloride.

9. A method of refining a sulphurized abietyl compound which includes treating said sulphurized abietyl compound in crude form in solution in a solvent inert thereto with an anhydrous halide of an amphoteric element selected from the group consisting of boron trifluoride, zinc chloride, aluminum chloride, stannic chloride, antimony chloride and sulphur monochloride.

10. A method of refining a sulphurized pine oil which includes treating said sulphurized pine oil in crude form in solution in gasoline with an anhydrous halide of an amphoteric element selected from the group consisting of boron trifluoride, zinc chloride, aluminum chloride, stannic chloride, antimony chloride and sulphur monochloride.

JOSEPH N. BORGLIN.